United States Patent

Van Acoleyen et al.

[11] Patent Number: 6,138,430
[45] Date of Patent: Oct. 31, 2000

[54] CEMENTITIOUS BUILDING PANEL WITH CUT BEAD

[75] Inventors: Bertrand Van Acoleyen, Kapelle-op-den-bos, Belgium; Toussaint Dolmans, Sinking Spring, Pa.

[73] Assignee: Cemplank, Inc., Bandon, Pa.

[21] Appl. No.: 09/193,770

[22] Filed: Nov. 17, 1998

Related U.S. Application Data

[60] Provisional application No. 60/065,900, Nov. 17, 1997.

[51] Int. Cl.[7] .................................................. E04G 21/00
[52] U.S. Cl. ..................... 52/745.19; 52/518; 52/717.05; 52/733.2
[58] Field of Search ............................. 52/313, 518, 553, 52/717.05, 717.04, 745.19, 733.2, 733.3; 29/897.3

[56] References Cited

U.S. PATENT DOCUMENTS

| | | |
|---|---|---|
| 4,132,555 | 1/1979 | Barrable . |
| 4,133,928 | 1/1979 | Riley et al. . |
| 4,261,754 | 4/1981 | Krenchel et al. . |
| 4,306,911 | 12/1981 | Gordon et al. . |
| 4,543,159 | 9/1985 | Johnson et al. . |
| 4,808,229 | 2/1989 | Arhelger . |
| 5,029,425 | 7/1991 | Bogataj ..................................... 52/482 |
| 5,112,405 | 5/1992 | Sanchez . |
| 5,167,710 | 12/1992 | Leroux et al. . |
| 5,312,858 | 5/1994 | Folsom ..................... 524/435 |
| 5,397,631 | 3/1995 | Green et al. ............................. 428/219 |
| 5,465,547 | 11/1995 | Jakel . |
| 5,718,943 | 2/1998 | Hsu et al. ................................ 427/136 |
| 5,722,386 | 3/1998 | Fladgard et al. ..................... 125/23.01 |
| 5,744,078 | 4/1998 | Soroushian et al. ....................... 264/82 |
| 5,858,083 | 1/1999 | Stav et al. ................................ 106/735 |
| 5,891,374 | 4/1999 | Shah et al. ............................... 264/108 |
| 5,948,505 | 9/1999 | Puppin ..................................... 428/121 |

*Primary Examiner*—Christopher T. Kent
*Assistant Examiner*—Jennifer I. Thissell
*Attorney, Agent, or Firm*—Duane, Morris Heckscher

[57] ABSTRACT

A cementitious building product such as a siding clapboard is composed of about 30 to 50% cement, 40 to 60% sand and 5 to 15% fiber, by volume. A preferred mix has about 35% portland cement, 55% fine sand and 10% cellulose fiber by volume. As so composed the product can be worked after curing in a manner similar to wood. At least one elongated cut is formed after curing the product in the shape of an elongated board or plank, preferably by planing or routing the product along an edge to form a distinct bead that can be round, teardrop shaped, crowned or coved.

6 Claims, 2 Drawing Sheets

CEMENTITIOUS BUILDING PANEL WITH CUT BEAD

This application claims priority from a provisional patent application entitled Cementitious Building Panel with Cut Bead, filed by the same inventors on Nov. 17, 1997, and accorded Ser. No. 60/065,900.

BACKGROUND OF THE INVENTION

1. Field of the Invention

The invention relates to the field of cementitious building materials and in particular concerns a siding clapboard comprising a mixture of sand, cement and a fibrous organic filler, which after forming to the shape of a plank which can be embossed with a simulated wood grain or can be smooth, is planed or routed to provide a cut bead along at least one edge.

2. Prior Art

Fiber reinforced hydraulically setting materials are durable and useful for building products such as exterior siding, roofing and the like. A slurry is mixed of one or more hydraulic binding agents such as portland cement, together with fine sand, water, a fibrous filler and optionally certain additives. The slurry is shaped to finished size and then cured. The resulting product is employed in a manner similar to other building materials such as wood or metal.

In a known forming process sometimes called the Hatschek process, a slurry as described is mixed, and with the aid of one or more dewatering sieves is deposited on an absorbent layer of felt. The felt is passed around a roller, and the dewatered slurry is transferred from the felt to the roller where it is built up in layers to the required product thickness. The roller can be smooth or can have ridges aligned substantially circumferentially, for imprinting the product with surface variations resembling the grain of a wooden clapboard. The layered slurry deposited on the roller is then subdivided into elongated panels or planks. After forming, the product is cured, for example for 24 hours, and then is treated with steam and pressure to complete hydration.

Examples of cementitious building products and methods for making them, including the addition of fiber and other materials either for reinforcement or for reducing product density and including details of Hatschek machines, are disclosed for example in the following U.S. patents, which are hereby incorporated:

U.S. Pat. No. 4,132,555—Barrable
U.S. Pat. No. 4,133,928—Riley et al.
U.S. Pat. No. 4,306,911—Gordon et al.
U.S. Pat. No. 4,543,159—Johnson et al.
U.S. Pat. No. 4,808,229—Arhelger
U.S. Pat. No. 5,112,405—Sanchez
U.S. Pat. No. 5,167,710—Leroux et al.
U.S. Pat. No. 5,465,547—Jakel.

In addition to forming a surface wood grain pattern, the roller can have other variations in radial dimension for shaping the product. For example in clapboard siding, it is known to form a rounded decorative bead on one elongated edge by depressing the product thickness at the extreme edge and at a space from the edge. Likewise, to cause successive clapboards to lap more closely when installed, the edge opposite from the bead can be compressed in thickness. These thickness variations are formed in the uncured slurry, and due to settling and deformation of the wet slurry the resulting bead and thinned edge are relatively indistinct.

SUMMARY OF THE INVENTION

It is an object of the invention to provide an improved fibrous cement building product in which a panel or plank is composed so as to be readily workable in a manner similar to wood, and to rework the shape of the product subsequent to curing.

It is another object of the invention to work a panel of fibrous cement by cutting the cured product and thereby to form a more distinct contour than is possible via molding steps.

It is a further object to employ a planing or router bit to form at least one cut in a cured fibrous cement product.

These and other objects are accomplished by a cementitious building product for use as a siding clapboard or the like, composed substantially of approximately equal volumes of hydrating cement and sand, and a quantity of organic fiber, preferably cellulose. For example, the product can be formed of a slurry containing 30 to 50% cement, 40 to 60% sand and 5 to 15% fiber, in each case by volume. A preferred mix comprises about 35% portland cement, 55% fine sand and 10% cellulose fiber by volume. As so composed the product can be worked after curing in a manner similar to wood. At least one elongated cut is formed after curing the product in the shape of an elongated board or plank, preferably by planing or routing the product along an edge to form a distinct bead that can be round, teardrop shaped, crowned or coved.

The product is formed by mixing a slurry of cement, sand and fiber, depositing a layer of the slurry on an absorbent felt mat, preferably in combination with a sieve for dewatering the slurry as in a Hatschek machine, and transferring the layer from the mat to a roller such that successive layers of slurry are accumulated to the desired thickness. The roller can be smooth or can have a surface contour leaving an imprint resembling wood grain. The product is separated from the roller, including making at least one cut parallel to the roller axis, and is hydrated and cured. The curing can be accelerated by steam autoclaving.

In a preferred arrangement, the product is routed along one longitudinal edge for form a bead extending from a notch spaced from the edge. The bead can be round, elliptical, teardrop shaped, curved to form a crown or cove, etc., and preferably forms the decorative outer edges of lapped siding clapboards. Routing or planing to form a bead is made possible without undue tooling requirements, by the relatively low density of the fibrous cement. The routed bead is substantially more distinct than a bead made by compressing the uncured slurry.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
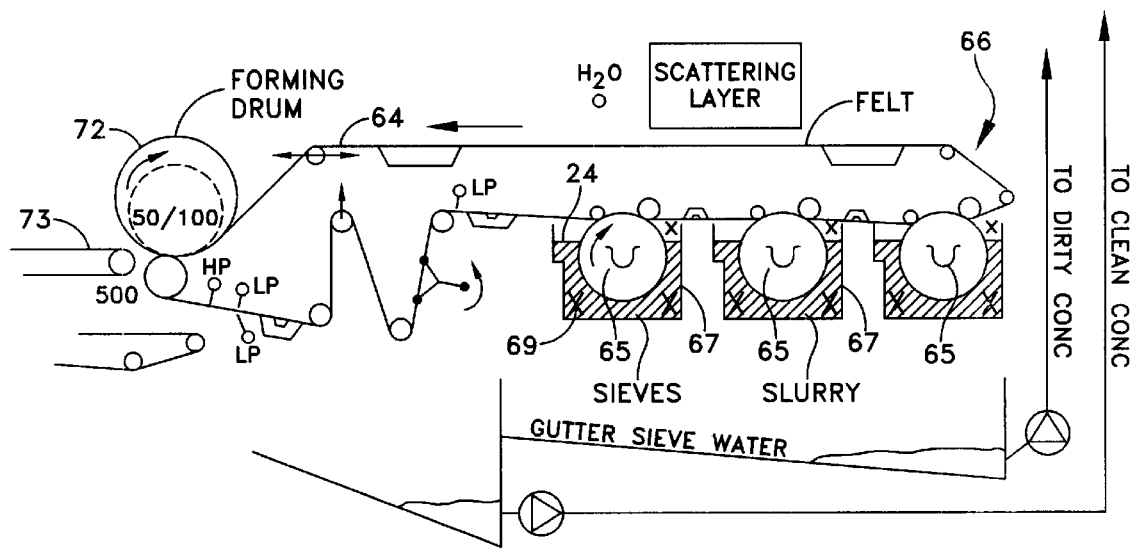
FIG. 1 is a schematic elevation view showing the process of forming a cementitious building panel according to the invention, using a Hatschek machine to transfer slurry from a supply of slurry to a felt mat including dewatering using sieves, and transferring the dewatered slurry to build up layers on a forming drum from which the layers are parted, cured and cut along an edge.
Figure 2:
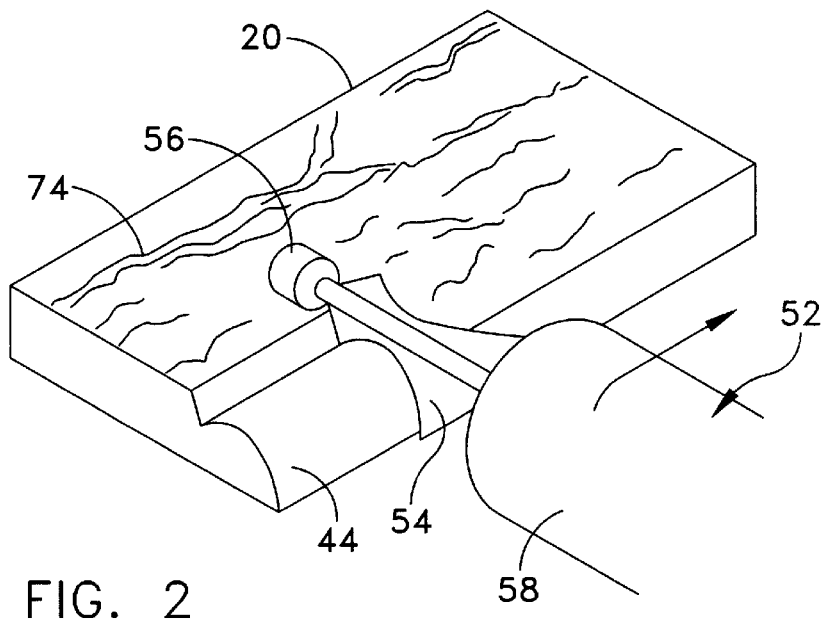
FIG. 2 is a perspective illustration showing cutting a bead in the panel after curing, by use of a cutting tool.
Figure 3:
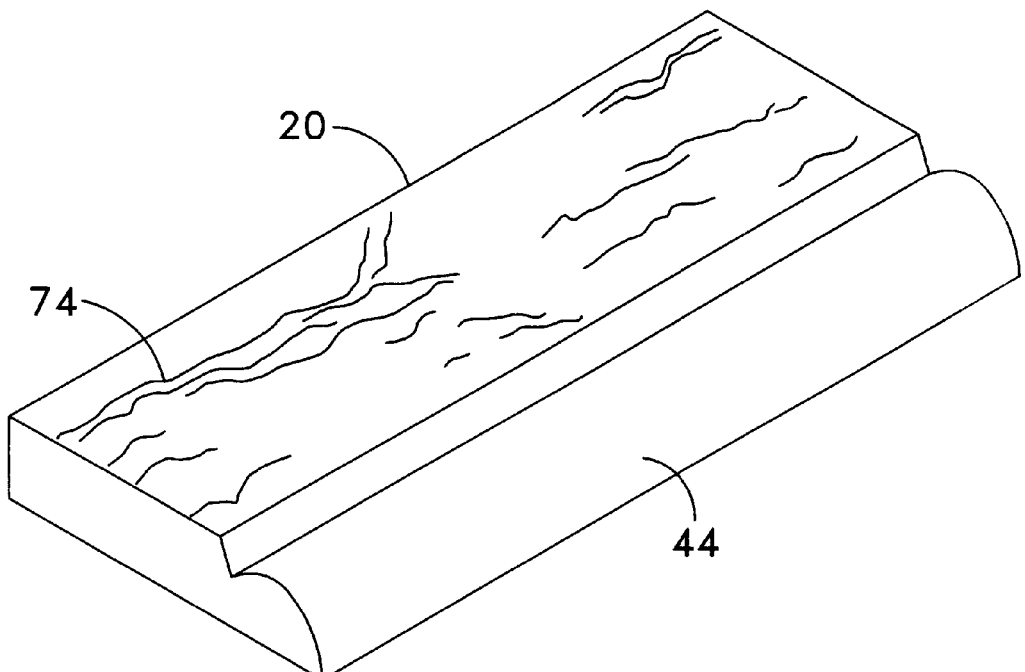
FIG. 3 is a perspective view showing the finished building panel, in particular illustrated as a length of siding clapboard.

Referring to FIGS. 1–3, a building product such as a siding clapboard 20 or the like is constructed by mixing a slurry 24 comprising hydrating cement, filler, water and fiber; forming the slurry into an elongated body 42 of predetermined length; and curing the slurry. As shown in FIG. 2, the cured body is then cut to form a beaded edge 44 by planing or routing the cured material.

In FIG. 2 a round bead is formed using a router 52, namely power cutting the cured material with a rotating cutting bit 54 shaped to complement the bead, supported against the workpiece on a roller 56 and powered by a motor 58. Other bead shapes are also possible and can be more or less complicated. For example, instead of a round bead, a convex or concave teardrop bead, a crown or a cove, or combinations of these as well as flats and notches, can be formed along one or more edges of the workpiece. The routing or planing of the product likewise can be accomplished in a conventional manner using a router supported on the face surfaces of clapboard 20 or on a lateral edge. Alternatively, a fixed planer can be employed, with a cutting bit contacting the product from above or below. Additionally, the cutting bit 54 can be movable relative to the clapboard 20, or vice versa.

The invention is particularly applicable to fibrous cement exterior siding panels or clapboards. A cut bead 44 on an edge of clapboard 20 is exposed when the clapboard is lapped over a next clapboard or panel, and forms a distinct decorative line or feature that is repeated in the pattern of lapped clapboards. In addition to this decorative aspect, comparable to a milled wood clapboard, the fibrous cement clapboard has substantially improved durability as compared to wood. The product is dimensionally stable, is not subject to damage from fire, rot or insects, and coatings adhere securely and durably due to its dimensional stability and porosity.

The included fiber 32 reduces the density of the clapboard or other building panel as compared to concrete while improving strength. The product can be cut and otherwise worked in a manner similar to wood and can receive nails or other fasteners without breakage. The hydrating cement preferably comprises portland cement. The filler comprises a fine sand, and the fiber is preferably organic, for example comprising cellulose fiber. According to a preferred composition, the product is made by mixing the slurry from about 30 to 50% cement, 40 to 60% sand and 5 to 15% fiber, in each case by volume. A preferred mix comprises about 35% portland cement, 55% fine sand and 10% cellulose fiber by volume.

These materials are combined in a conventional mixer and as shown in FIG. 1 are applied to an absorbent pad 64 that is passed over one or more rollers 65 disposed in tanks 67 containing sieves 69 that dewater the slurry, the excess water (and some entrained slurry) being collected and recycled into newly mixed slurry. The pad 64 can comprise a felt covered endless belt conveyor 66 carrying the slurry toward a forming roller 72.

A thin layer of slurry 24 is applied to the felt pad 64 at each roller 65. In the embodiment shown in FIG. 1, three application rollers 65 are serially disposed along the path of pad 64. However many layers are applied to pad 64, the pad makes successive passes over the forming roller 72 and can thus build up any desired thickness on the forming roller. In a preferred arrangement, 30 or more layers are used to build up a thickness of about 1 centimeter, which in the embodiment of FIG. 1 would represent 10 or more revolutions of forming roller 72, each accumulating three thicknesses of slurry from the three application rollers 65. The layered slurry on the felt pad can be adjusted as to water content by scattering a dry cement/sand/fiber mix on the pad or by spraying additional water onto the pad.

The pad 64 and the layers of dewatered slurry thereon are passed over and compressed against forming roller 72, causing the layers of slurry to be deposited on roller 72. The roller 72 can be smooth or can be embossed with a pattern 74 resembling natural wood grain, which pattern is likewise transferred to the slurry by the roller 72. In addition, the felt pad 64 can have laterally elongated thickness variations, which transfer a pattern through the product, producing surface variations on the roller side that resemble transverse saw cut marks in wood. When the desired thickness is obtained, a cut is made transverse to the direction of pad 64 (i.e., parallel to the axis of roller 72), whereupon the layered slurry is released onto an outlet conveyor 73 to be hydrated and cured. It is possible to make a plurality of lateral cuts to divide the product into planks or clapboards having a length equal to the width of the slurry, or to make a single lateral cut and otherwise divide the slurry into planks or clapboards which in that case have a length equal to the circumference of forming roller 72.

Figure 4:
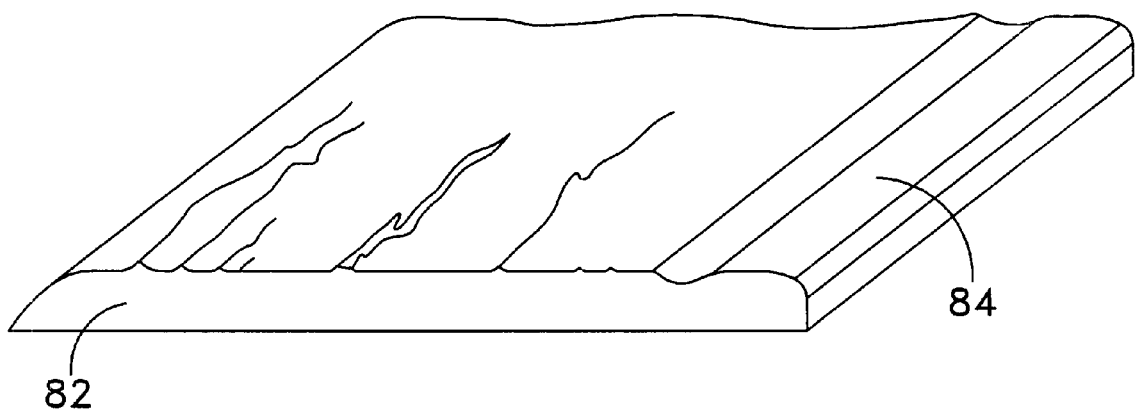
FIG. 4 is a perspective view showing a conventional cementitious building panel with a molded bead edge, and is labelled as prior art.

A length of finished building product is shown in FIG. 3, which can be compared to a conventional cementitious panel 82 having an edge bead made by a roller during the molding part of the process, as opposed to cutting after curing. Such a roller-molded bead 84 is shown in FIG. 4, which is labelled as prior art. The inventive product in FIG. 3 has a partly round bead 44 extending from a sharp notch or groove spaced from the edge. This form of bead is substantially more distinct than molded bead 84, wherein the pressed slurry is subject to sagging deformation or relaxation after it is molded by the roller and before it hardens by curing. In addition, the cut bead 44 of the invention is smooth, whereas a molded bead is characterized by a rougher surface even if formed with a portion of roller contour that is not embossed with a wood grain or other pattern.

Accordingly, the product of the invention comprises an elongated body 20 formed and cured from a slurry of at least one hydrating binder, a filler and a fiber, the body having a least one cut 44 formed after curing and extending along a direction of elongation of the body. In a preferred embodiment, the slurry consists essentially of about 30 to 50% cement, 40 to 60% sand and 5 to 15% fiber, in each case by volume. A preferred mix is about 35% portland cement, 55% fine sand and 10% cellulose fiber by volume, plus sufficient water to render the slurry workable. After the forming step, the slurry is preferably cured for 24 hours and then subjected to steam autoclaving to complete the hydration process. The elongated bead 44 is cut along at least one edge of the body after the slurry has hardened, which can be accomplished before or after the autoclaving step.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A method of forming a building product, comprising the steps of:

mixing a slurry of hydrating cement, filler, water and fiber;

forming the slurry into an elongated body of predetermined length having at least two longitudinal edges and curing the slurry;

cutting the body after said curing by at least one of planing and routing so as to form (i) a notch extending into a portion of said body and spaced inwardly of said longitudinal edges and (ii) a bead that extends inwardly from one of said at least two longitudinal edges to said notch.

2. The method of claim 1, wherein said cutting comprises routing the body along one of said at least two longitudinal edges to form at least one of a round bead, a teardrop bead, a crown and a cove along said edge.

3. The method of claim 1, wherein the cement comprises portland cement, the filler comprises sand and the fiber is organic.

4. The method of claim 3, wherein the fiber comprises cellulose.

5. The method of claim 2, comprising mixing said slurry from about 30 to 50% cement, 40 to 60% sand and 5 to 15% fiber, in each case by volume.

6. The method of claim 5, comprising mixing said slurry from about 35% portland cement, 55% fine sand and 10% cellulose fiber by volume.

* * * * *